Figure 1:
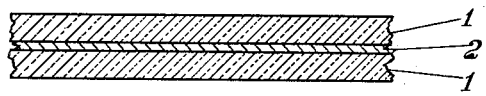

Oct. 29, 1935.  W. H. CAROTHERS ET AL  2,019,118

LAMINATED ARTICLE

Filed June 14, 1934

Wallace H. Carothers
Gerard J. Berchet    INVENTORS
Ralph A. Jacobson
BY

J. M. Castle Jr.
ATTORNEY.

Patented Oct. 29, 1935

2,019,118

UNITED STATES PATENT OFFICE 2,019,118

LAMINATED ARTICLE

Wallace H. Carothers, Arden, Gerard J. Berchet, Wilmington, and Ralph A. Jacobson, Arden, Del., assignors to E. I. du Pont de Nemours & Company, Wilmington, Del., a corporation of Delaware Original application November 11, 1931, Serial No. 574,358. Divided and this application June 14, 1934, Serial No. 730,544. In France and Germany February 28, 1933

7 Claims. (Cl. 49—81)

This invention relates to laminated articles and, more particularly, to so-called "safety glass" or laminated glass in which the sheets of glass, with or without an interposed sheet, or sheets, of cellulose derivative plastic composition, are united by a film of a polymer of a vinylethinyl carbinol and to a method of preparing such laminated glass. This application is a division of applicant's copending application Serial No. 574,358, filed November 11, 1931, entitled "Vinylethinyl carbinol polymers and processes for preparing same", wherein polymers of vinylethinyl carbinol and the preparation of same are claimed.

In the copending application of Carothers and Berchet, Serial No. 574,456, filed November 11, 1931, there is described a method of preparing dimethyl vinylethinyl carbinol from monovinyl acetylene and acetone by means of the Grignard reaction, the equations being as follows:

$CH_2=CH-C\equiv CH+CH_3MgBr \rightarrow CH_2=CH-C\equiv C-MgBr+CH_4$ $CH_2=CH-C\equiv C-MgBr+CH_3CO-CH_3 \rightarrow CH_2=CH-C\equiv C-C(OMgBr)(CH_3)_2$

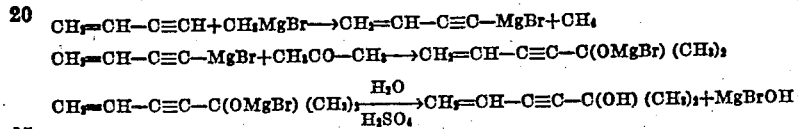

In the copending application of Carothers and Jacobson, Serial No. 574,359, filed November 11, 1931, is described a convenient method of preparing this carbinol from monovinyl acetylene and acetone by means of sodamide as the condensing agent, the reactions being as follows:

$CH_2=CH-C\equiv CH+NaNH_2 \rightarrow CH_2=CH-C\equiv C-Na+NH_3$ $CH_2=CH-C\equiv C-Na+CH_3COCH_3 \rightarrow CH_2=CH-C\equiv C-C(ONa)(CH_3)_2$

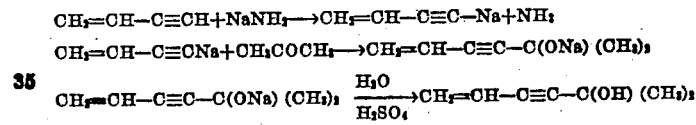

These methods were extended to include aldehydes and ketones other than acetone and the following vinylethinyl carbinols were prepared and described; methyl ethyl vinylethinyl carbinol, diethyl vinylethinyl carbinol, dipropyl vinylethinyl carbinol, methyl octyl vinylethinyl carbinol, methyl vinylethinyl carbinol, propyl vinylethinyl carbinol, methyl phenyl vinylethinyl carbinol, diphenyl vinylethinyl carbinol, 1-cyclopentyl vinylethinyl carbinol, and 1-cyclohexyl vinylethinyl carbinol.

All of these carbinols have been found to polymerize readily, and although differing as to rate, they generally undergo the following tran formations when subjected to polymerizing influences: (1) they progressively increase in viscosity becoming less and less mobile and finally non-mobile, the solids thus obtained being initially rubbery in nature; (2) the rubbery solids slowly change into hard, transparent, glass-like, insoluble resins. All of these resin-like polymers are new.

An object of the present invention is to provide a new and improved type of laminated article. A further object is to provide a new and improved type of laminated glass in which the laminae are united by means of a film of great strength. A still further object is to provide a method of making laminated glass wherein the above mentioned polymers of vinylethinyl carbinol are employed. Other objects of the invention will be apparent from the description given hereinafter.

The above objects are accomplished according to the present invention by uniting two or more laminae by means of a film containing a polymer of vinylethinyl carbinol. More particularly, the invention comprises laminated glass composed of two sheets of glass united by a film containing a polymerized vinylethinyl carbinol of the substantially infusible, insoluble, transparent type, or composed of two sheets of glass with an interlayer sheet of cellulose derivative, or the like, the sheets being united by interposed films of a polymerized vinylethinyl carbinol. In another form the laminated glass may be composed of a single sheet of glass united to a reinforcing sheet of cellulose derivative plastic, or the like, by means of a film of a polymerized vinylethinyl carbinol.

Figure 2:
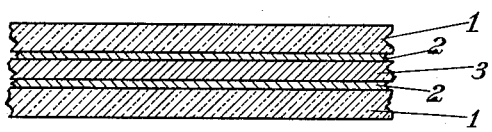
Figure 3:
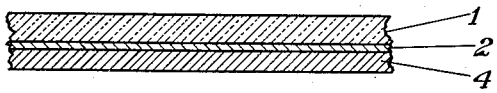

In the accompanying drawing forming a part of the present application are shown in Figs. 1, 2, and 3 sectional views of laminated glass according to specific embodiments of the present invention.

In Fig. 1 reference numeral 1 indicates sheets of glass united by a film 2 of a polymerized vinylethinyl carbinol.

In Fig. 2 an alternative embodiment of the invention is illustrated wherein sheets of glass 1 and interlayer sheet 3 of cellulose derivative plastic are united by interposed films 2 of a polymerized vinylethinyl carbinol.

In Fig. 3 is illustrated an alternative form of the invention wherein a glass sheet 1 is united to a reinforcing sheet 4 of cellulose derivative plastic, or the like, by means of a film 2 of a polymerized vinylethinyl carbinol.

The polymerization of the vinylethinyl carbinols is readily effected by the presence of oxygen (air) and/or light. Thus if a vinylethinyl carbinol is exposed to the atmosphere in an open glass vessel, it will polymerize to a glass-like resin during a period of from several weeks to several months. The polymerization may be accelerated by the use of superatmospheric pressure, by the use of elevated temperature and by the use of suitable polymerization catalysts. The catalysts which are preferred for the polymerization of vinylethinyl carbinols belong to three classes. The first class includes metallic or metalloidal halides of elements of amphoteric or acid forming nature, such as the halides of zinc, iron, aluminum, antimony, bismuth, boron, and tin. A second class consists of oxidation accelerators such as benzoyl peroxide, acetyl peroxide, oxidized turpentine and other organic peroxides, ozone, hydrogen peroxide, and persalts, such as perborates, percarbonates, peruranates, permonosulfates, perchromates, which persalts are characterized by the atomic grouping OOM where M represents a metal. A third class of polymerization accelerators consists of accelerators of the photochemical polymerization effect and this class is exemplified by uranyl nitrate.

We have further found that the transformation from monomer to polymer can be controlled to produce polymers corresponding to two general types depending upon the method employed. The first type of polymer is a hard, transparent, glass-like and nearly colorless resin of slight solubility and limited fusibility. Polymers of this type are obtained preferably by the action of light upon the carbinol either with or without a polymerization catalyst such as benzoyl peroxide or uranyl nitrate. The second type of polymer is a brown, transparent resin, which in contrast to the polymer obtained by the action of light, is readily soluble and fusible. This polymer is preferably obtained by the action of heat either with or without a polymerization catalyst.

The light polymers can be prepared under a variety of conditions without affecting the essential character of the final products obtained. By suitable modifications in the method of preparation, the light polymers can be obtained in varying stages of polymerization ranging from the intermediate polymers, which are soluble in the common organic solvents to hard insoluble resins. The intermediate polymers are potentially reactive and can later be converted to the insoluble modification as needed. The advantages of these properties are obvious since the degree of solubility and fusibility can be adapted to conform to the application desired.

The heat polymers can be prepared by heating the carbinol at various temperatures ranging up to their boiling points. Polymerization takes place more rapidly if benzoyl peroxide or an equivalent catalyst is added, or if air is bubbled through the liquid during the heating. The heat polymers can also be prepared directly in solution in such common organic solvents as toluene or the monoethyl ether of ethylene glycol. Under these conditions the monomeric carbinol is dissolved in the solvent and heated under a reflux condenser until the desired degree of polymerization is attained. The polymerization in solution likewise proceeds more rapidly if benzoyl peroxide or similar catalyst is added or if air is bubbled into the solution. After a few hours of heating, films prepared from the solutions are found to dry rapidly at room temperature. As in the case of the light polymers described above, varying degrees of polymerization can be obtained by varying the experimental conditions. The more highly polymerized products are obtained by increasing the time of heating and the temperature. The highly polymerized heat polymer is both soluble and fusible as distinguished from the completely polymerized light polymer which is both infusible and insoluble. The intermediate heat polymers are soluble in the ordinary organic solvents.

It will be apparent from the above that, in the manufacture of laminated glass, the light polymer is preferred because it is characteristically nearly colorless and, in thin films, is colorless for practical purposes. Furthermore, it is transparent, substantially insoluble and infusible, and will adhere to glass with phenomenal tenacity when properly applied. However, the heat polymer may also be employed in the manufacture of glass, as, in many uses, the brown color which is, of course, not so apparent in thin films, is not objectionable.

In order to illustrate the invention, the following specific examples are given, showing the preparation of these polymers and the preparation of laminated glass employing these polymers as adhesives or bonding agents:—

*Example 1.—Preparation of insoluble light polymers from methyl ethyl vinylethinyl carbinol*

(a) Fifty grams freshly distilled methyl ethyl vinylethinyl carbinol containing one percent benzoyl peroxide was exposed to a Cooper-Hewitt light. In 72 hours the product was a hard, transparent, pale-yellow, glass-like resin, comparatively infusible and having no appreciable solubility in organic solvents.

(b) Twenty-five grams methyl ethyl vinylethinyl carbinol containing one percent benzoyl peroxide was exposed to a 150-watt Mazda light. In 4 days, a product similar to that described under (a) was obtained.

(c) Twenty-five grams methyl ethyl vinylethinyl carbinol containing one percent uranyl nitrate was exposed to a Cooper-Hewitt light. In 72 hours, a hard, transparent, amber-colored resin was obtained.

(d) Twenty-five grams methyl ethyl vinylethinyl carbinol containing no catalyst was exposed to a Cooper-Hewitt light. After one week, a hard, transparent, pale-yellow resin was obtained.

By interrupting the polymerization before the final hard polymers are formed, syrupy intermediate products are obtained which are useful as adhesives. A noteworthy property of the intermediate syrupy products is the fact that if they are applied to glass and the polymerization subsequently completed, the union between glass and polymer possesses remarkable strength and it is practically impossible to separate them. This represents a valuable property for the preparation of safety or non-shatterable glass. The following example illustrates the application of the syrupy intermediate polymers for the manufacture of non-shatterable glass.

*Example 2.—Safety glass*

A sample of methyl ethyl vinylethinyl carbinol was exposed to a Mazda light for 24 hours. The syrupy product was applied to a glass plate as a film of uniform thickness and a second glass plate superimposed upon the first. Pressure was applied and the plates exposed to light until polymerization was complete. The plates of glass adhered very tenaciously. The syrupy intermediate polymers may also be used to bond sheets of cellulose derivatives to glass.

*Example 3.—Preparation of a soluble light polymer from methyl ethyl vinylethinyl carbinol*

Four hundred grams of methyl ethyl vinylethinyl carbinol was dissolved in 400 g. toluene and 4 g. of powdered benzoyl peroxide added. The solution was exposed at room temperature to a Cooper-Hewitt light for 62 hours. At this stage the solution was still practically colorless but could not be diluted with toluene without separation of resin. No precipitation occurred, however, when the solution was diluted with alcohols, ketones, or esters.

*Example 4.—Preparation of a soluble heat polymer from methyl ethyl vinylethinyl carbinol*

Two hundred ninety-three grams of methyl ethyl vinylethinyl carbinol was dissolved in 293 g. monoethyl ether of ethylene glycol and the solution gently refluxed for 10 hours. A slow stream of air was bubbled through the solution during the heating. At the end of 10 hours the solution had darkened somewhat and had increased considerably in viscosity.

*Example 5.—Preparation of insoluble light polymers from dimethyl vinylethinyl carbinol*

One hundred parts of dimethyl vinylethinyl carbinol containing one part of benzoyl peroxide was exposed to a Cooper-Hewitt light. At the end of 48 hours, the product was a hard, transparent, pale-yellow, glass-like resin.

*Example 6.—Preparation of a soluble light polymer from dimethyl vinylethinyl carbinol*

One hundred parts of dimethyl vinylethinyl carbinol was dissolved in 100 parts of toluene and 1 part of benzoyl peroxide added. The solution was exposed at room temperature to a Cooper-Hewitt light. At the end of 72 hours, the solution was still colorless but had somewhat increased in viscosity.

*Example 7.—Preparation of a soluble heat polymer from dimethyl vinylethinyl carbinol*

(a) A solution of 100 parts of dimethyl vinylethinyl carbinol in 100 parts of monoethyl ether of ethylene glycol was gently refluxed while a stream of air was bubbled into the solution. After three hours, films flowed from this solution dried in less than two hours. At the end of six hours the solution had darkened somewhat and increased in viscosity. Films from this solution dried very rapidly.

It should be emphasized that the above examples merely set forth certain methods of carrying out the invention. It is obvious that modifications can be made in the methods of polymerization. Thus, instead of employing a Cooper-Hewitt light for the light-polymerization of the vinylethinyl carbinols, other sources of light including sunlight, may be employed. Instead of toluene, other organic solvents such as acetone, butyl acetate, diethylene glycol, etc., may be employed when the carbinols are polymerized in solution. Likewise, in place of benzoyl peroxide or uranyl nitrate, other catalysts such as oxidized turpentine, inorganic peroxides, and stannic chloride may be substituted. The examples describe processes of light-polymerization at room temperature, but it is obvious that higher or lower temperatures may be used, depending upon the rate of polymerization desired. Inhibitors such as hydroquinone may be added to the partially polymerized carbinols for the purpose of decreasing the rate of subsequent polymerization or to prevent further polymerization, depending upon the amount of inhibitor which is added. Other inhibitors such as pyrogallol, cathechol, p-phenylenediamine, phenyl-naphthylamine, etc., may be used.

Similarly, for the preparation of the soluble heat polymers, solvents other than the monoethyl ether of ethylene glycol or toluene may be used. Also, the polymerization can be carried out at higher or lower temperatures, and with or without the addition of catalysts such as benzoyl peroxide. Instead of air, oxygen may be bubbled into the solutions. The time of polymerization may vary considerably depending upon the temperature, solvent, presence or absence of catalyst, amount of air or oxygen employed, and on other experimental conditions.

The effect of light and heat on the polymerization and on the character of the polymer has been particularly emphasized due to the great value of light and heat polymers. The scope of the invention, however, is intended to include vinylethinyl carbinol polymers however produced.

For the application of the polymers in adhesive compositions, numerous modifications of the above examples are possible, depending upon the type of product desired. It is to be understood that the polymers can be employed with film-forming materials other than pyroxylin. Also they may be incorporated with natural or synthetic resins, drying oils, cellulose acetate, ethyl cellulose, softeners, and the like.

The influence of pressure, oxygen, and catalysts on the polymerization of vinylethinyl carbinols is illustrated in the following examples:—

*Example 8.—Polymerization under pressure*

A sample of methyl ethyl vinylethinyl carbinol was placed in a press and submitted to a pressure of 6,000 atmospheres at 50° C. for 76 hours. The carbinol polymerized to a pale yellow, transparent, non-elastic, resinous solid.

*Example 9.—Polymerization in the presence of oxygen*

A sample of methyl ethyl vinylethinyl carbinol was allowed to stand in a partially-filled bottle in which the air had been displaced by oxygen. In a few days the liquid had thickened considerably and after one week the product was a soft, plastic, sticky, pale yellow, transparent solid.

*Example 10.—Polymerization in the presence of a catalyst*

A sample of dimethyl vinylethinyl carbinol was treated with one percent of anhydrous stannic chloride. On standing for several days, a dark-brown, sticky, solid polymer was obtained.

Examples 8 to 10 are purely illustrative. Thus, any superatmospheric pressures may be used in lieu of that described in Example 8, although pressures of several atmospheres are more effective than the lower pressures. Air may be used in place of oxygen, although its polymerizing effect is less than that of oxygen, due to its dilution with nitrogen.

The use of pressure during polymerization may be accompanied by the presence of catalysts, light, elevated temperature, or oxygen. Likewise, polymerization in the presence of oxygen or catalysts may be carried on in the presence of any other agents which influence polymerization.

Although the invention has been particularly described with respect to a preferred embodiment, i. e., the lamination of sheets of glass to each other by means of a partially light polymerized vinylethinyl carbinol and subsequently completing the polymerization by exposure to light, it will be apparent to those skilled in the art that many variations of this procedure come within the scope of the invention. These polymers may be used with great success, not only in laminating glass sheets, but in laminating sheets of all sorts of materials including fabric, sheets of cellulose derivative such as cellulose nitrate, acetate, and other plastics. In fact, laminated glass is ordinarily made with an interlayer sheet of cellulose derivative plastic, or plastic of similar properties. Also, some shatterproof glass is made with a single sheet of glass bonded to a sheet of plastic. In all of these laminated articles the polymers herein described make excellent bonding agents.

It is preferred that the lamination procedure set forth in Example 2 be employed because of the remarkable strength of the bond obtained. Nevertheless, these polymers may be applied dissolved in solvents or according to the other methods employed in the laminating art.

As many apparently widely different embodiments of this invention may be made without departing from the spirit and scope thereof, it is to be understood that the invention is not limited to the specific embodiments thereof except as defined in the appended claims.

We claim:

1. A laminated article comprising two laminae united by a film containing a polymer of a vinylethinyl carbinol.

2. A laminated article comprising two laminae united by a film of a transparent, substantially insoluble and infusible light polymer of a vinylethinyl carbinol.

3. A laminated article comprising two laminae united by a film of a transparent, substantially insoluble and infusible light polymer of methyl ethyl vinylethinyl carbinol.

4. A laminated article comprising two laminae, at least one of which is glass, united by a film containing a transparent, substantially insoluble and infusible light polymer of a vinylethinyl carbinol.

5. A laminated article comprising two sheets of glass united by a film containing a transparent, substantially insoluble and infusible light polymer of a vinylethinyl carbinol.

6. A laminated article comprising two sheets of glass and an intermediate sheet of a cellulose derivative plastic, said sheets being united by interposed films containing a transparent, substantially insoluble and infusible light polymer of a vinylethinyl carbinol.

7. A laminated article comprising two sheets of glass united by a film containing a transparent, substantially insoluble and infusible light polymer of methyl ethyl vinylethinyl carbinol.

WALLACE H. CAROTHERS.
GERARD J. BERCHET.
RALPH A. JACOBSON.